United States Patent
Katayama et al.

(10) Patent No.: US 7,106,943 B2
(45) Date of Patent: Sep. 12, 2006

(54) CODING DEVICE, CODING METHOD, PROGRAM AND RECORDING MEDIUM

(75) Inventors: Takashi Katayama, Osaka (JP); Kosuke Nishio, Osaka (JP); Masaharu Matsumoto, Osaka (JP); Akihisa Kawamura, Osaka (JP); Takeshi Fujita, Osaka (JP); Masahiro Sueyoshi, Osaka (JP); Kazutaka Abe, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 1165 days.

(21) Appl. No.: 09/955,356

(22) Filed: Sep. 18, 2001

(65) Prior Publication Data

US 2002/0034376 A1   Mar. 21, 2002

(30) Foreign Application Priority Data

Sep. 21, 2000   (JP) ............................. 2000-286543

(51) Int. Cl.
*H04N 5/91* (2006.01)
*H04N 7/00* (2006.01)

(52) U.S. Cl. ........................................ 386/46; 386/125

(58) Field of Classification Search ................ 710/1, 710/5, 6, 20; 360/32; 369/48, 54, 124; 386/46, 386/95, 104, 125
See application file for complete search history.

(56) References Cited

U.S. PATENT DOCUMENTS 5,931,934 A * 8/1999 Li et al. ................... 710/260

OTHER PUBLICATIONS

Nakajima et al. "MPEG Audit Bit Rate Scaling on Coded Data Domain"; proceedings of the 1998 IEEE International Conference on Acoustics, Speech and Signal Processing; May 12-15, 1998, pp. 3669-3672, XP010279585 Seattle, WA, US ISBN: 0-7803-4428-6.

Schroeder E F et al. Der MPEG-2-Standard: Generische Codierung Fuer Bewegtbilder Und Zugehoerige Audio-Information. Audio-Codierung (Teil 4)' Fernseh Und Kinotechnik, Vde Verlag GMBH, Berlin, De, vol. 48, No. 7/8, Aug. 30, 1994, pp. 364-368, XP000460964 ISSN: 0015-0142.

Official Communication mailed Dec. 9, 2003 for corresponding European Application 01967766.5.

* cited by examiner

*Primary Examiner*—Thai Tran
*Assistant Examiner*—Mishawn Dunn
(74) *Attorney, Agent, or Firm*—Renner, Otto, Boisselle & Sklar, LLP

(57) ABSTRACT

A coding device includes: a decoder for decoding a first stream signal in which a first video stream including a first video stream information generated by coding a first video signal and a first audio stream including a first audio stream information generated by coding a first audio signal are multiplexed; and a re-encoder for generating, based on the decoded first stream signal, a second video stream including a second video stream information having a bit rate lower than the first video stream information and a second audio stream including a second audio stream information having a bit rate lower than the first audio stream information, and multiplexing the second video stream is and the second audio stream to generate a second stream signal.

13 Claims, 12 Drawing Sheets

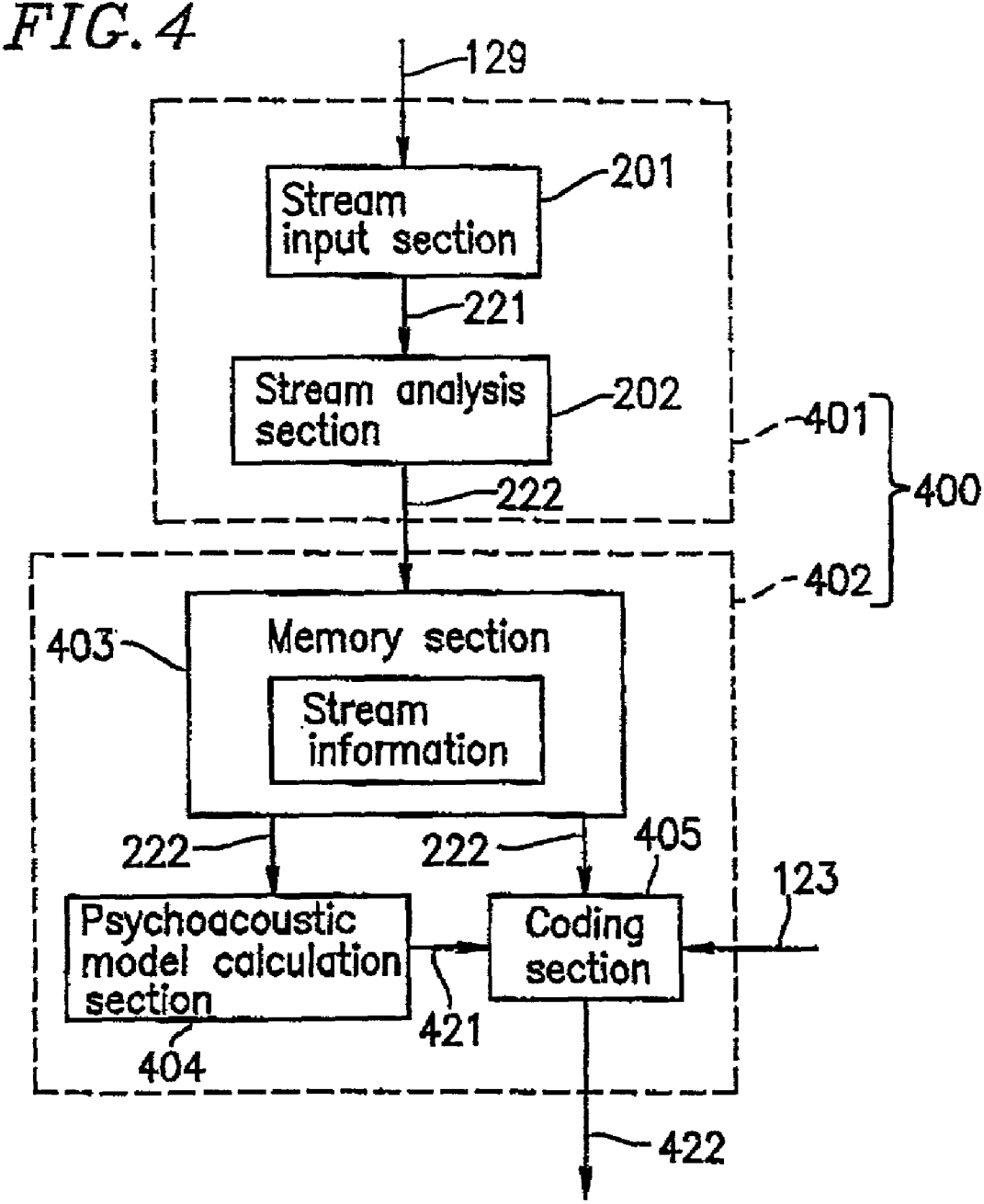

Frequency spectrum

Audibility masking curve

Lowest audible threshold

Overall masking curve

CODING DEVICE, CODING METHOD, PROGRAM AND RECORDING MEDIUM

BACKGROUND OF THE INVENTION

1. Field of the Invention

The present invention relates to a coding device and a coding method for changing a bit rate of a coded signal, a program for realizing coding processing and a program recording medium having such a program recorded thereon.

2. Description of the Related Art

In general, video and audio information transmitted by television program broadcasting or the like is recorded on a tape medium such as a videotape. Recording modes of recording video and audio information on such a videotape Includes a standard mode and a long mode. Compared to the standard mode, the long mode allows video and audio signals to be recorded on a tape having the same length for a longer period of time. In order to realize recording for such a long period of time in the long mode, the video signal is partially deleted so as to shorten the length of a tape required for recording video information for a unit of time.

In recent years, a specific technology for realizing digital satellite broadcasting has been developed. The video and audio signals used for such broadcasting have been decided to be transmitted in the form of digitally-coded signals. In the digital satellite broadcasting, the number of channels for transmitting audio signals is set to 5.1 channels and a maximum transfer rate of 320 kbps is standardized.

An amount of video and audio signals transmitted in the digital satellite broadcasting is greater than that of video and audio signals transmitted in conventional television program broadcasting. This requires a higher density recording medium as a recording medium for recording the video and audio signals thereon, and a recording technology using a DVD-RAM, which is an optical disc medium, has been developed. However, a total recording capacity of a recording medium such as an optical disc is fixed. Therefore, in order to have a longer period of recording in the recording medium with a fixed recording capacity, it is desirable that information included in a coded signal is recorded on a recording medium such that a quantity of the information recorded is less than that of the information at the time of transmission.

SUMMARY OF THE INVENTION

According to one aspect of the present invention, there is provided a coding device including: a decoder for decoding a first stream signal in which a first video stream including a first video stream information generated by coding a first video signal and a first audio stream including a first audio stream information generated by coding a first audio signal are multiplexed and a re-encoder for generating, based on the decoded first stream signal, a second video stream including a second video stream information having a bit rate lower than the first video stream information and a second audio stream including a second audio stream information having a bit rate lower than the first audio stream information, and multiplexing the second video stream and the second audio stream to generate a second stream signal.

In one embodiment of the invention, the first audio stream information is obtained by performing a time-frequency conversion on the first audio signal into a frequency domain signal to quantize the frequency domain signal: the re-encoder calculates psychoacoustic model information indicating frequency bands of the first audio signal masked by auditory characteristics; and the re-encoder converts, based on the psychoacoustic model information, the first audio stream information into the second audio stream information having a bit rate lower than the first audio stream information to generate the second audio stream.

In one embodiment of the invention, the quantization of the frequency domain signal is performed to indicate frequency spectrums for respective frequency bands of the frequency domain signal by mantissa parts and exponent parts; each of the exponent parts is a scale factor of each of the frequency spectrums for the respective frequency bands; the re-encoder calculates the psychoacoustic model information based on the scale factors of the frequency spectrums for the respective frequency bands included in the quantized frequency information; and the re-encoder converts the first audio stream information into the second audio stream information having a bit rate lower than the first audio stream information by reallocating, based on the psychoacoustic model information, the number of bits allocated to the mantissa parts.

In one embodiment of the invention, the quantization of the frequency domain signal is performed to indicate frequency spectrums for respective frequency bands of the frequency domain signal by mantissa parts and exponent parts; each of the exponent parts is a scale factor of each of the frequency spectrums for the respective frequency bands; the re-encoder calculates the psychoacoustic model information based on dequantized frequency spectrums for the respective frequency bands generated by dequantizing the first audio stream information; and the re-encoder converts the first audio stream information into the second audio stream information having a bit rate lower than the first audio stream information by reallocating, based on the psychoacoustic model information, the number of bits allocated to the mantissa parts.

In one embodiment of the invention, when performing downmix processing so as to reduce the number of channels of the second audio stream to less than the number of channels of the first audio stream, the re-encoder calculates the psychoacoustic model information based on dequantized frequency spectrums for the respective frequency bands on which downmix processing has been performed.

In one embodiment of the invention, the coding device further includes: a receiving section for receiving the first stream signal, a control section for indicating to the re-encoder section bit rates of the second video stream information and the second audio stream information, and a recording section for recording the second stream signal on a recording medium.

According to another aspect of the present invention, there is provided a coding method including: a first step of decoding a first stream signal in which a first video stream including a first video stream information generated by coding a first video signal and a first audio stream including a first audio stream information generated by coding a first audio signal are multiplexed; and a second step of generating, based on the decoded first stream signal, a second video stream including a second video stream information having a bit rate lower than the first video stream information and a second audio stream including a second audio stream information having a bit rate lower than the first audio stream information, and multiplexing the second video stream and the second audio strewn to generate a second stream signal, wherein the first audio stream information is obtained by performing a time-frequency conversion on the first audio signal into a frequency domain signal to quantize the frequency domain signal, and the second step includes:

a third step of calculating psychoacoustic model information indicating frequency bands of the first audio signal masked by auditory characteristics; and a fourth step of converting, based on the psychoacoustic model information, the first audio stream information into the second audio stream information having a bit rate lower than the first audio stream information to generate the second audio stream.

In one embodiment of the invention, the quantization of the frequency domain signal is performed to indicate frequency spectrums for respective frequency bands of the frequency domain signal by mantissa parts and exponent parts; each of the exponent parts is a scale factor of each of the frequency spectrums for the respective frequency bands; the third step calculates the psychoacoustic model information based on the scale factors of the frequency spectrums for the respective frequency bands included in quantized information; and the fourth step converts the first audio stream information into the second audio stream information having a bit rate lower than the first audio stream information by reallocating, based on the psychoacoustic model information, the number of bits allocated to the mantissa parts.

In one embodiment of the invention, the quantization of the frequency domain signal is performed to indicate frequency spectrums for respective frequency bands of the frequency domain signal by mantissa parts and exponent parts; each of the exponent parts is a scale factor of each of the frequency spectrums for the respective frequency bands; the third step calculates the psychoacoustic model information based on dequantized frequency spectrums for the respective frequency bands generated by dequantizing the first audio stream information; and the fourth step converts the first audio stream information into the second audio stream information having a bit rate lower than the first audio stream information by reallocating, based on the psychoacoustic model information, the number of bits allocated to the mantissa parts.

In one embodiment of the invention, when performing downmix processing so as to reduce the number of channels of the second audio stream to less than the number of channels of the first audio stream, the third step calculates the psychoacoustic model information based on dequantized frequency spectrums for the respective frequency bands on which downmix processing has been performed.

According to still another aspect of the present invention, there is provided a program for causing a computer to execute coding processing which includes: a first step of decoding a first stream signal in which a first video stream including a first video stream information generated by coding a first video signal and a first audio stream including a first audio stream information generated by coding a first audio signal are multiplexed: and a second step of generating, based on the decoded first stream signal, a second video stream including a second video stream information having a bit rate lower than the first video stream information and a second audio stream including a second audio stream information having a bit rate lower than the first audio stream information, and multiplexing the second video stream and the second audio stream to generate a second stream signal, wherein the first audio stream information is obtained by performing a time-frequency conversion on the first audio signal into a frequency domain signal to quantize the frequency domain signal, and the second step includes: a third step of calculating psychoacoustic model information indicating frequency bands of the first audio signal masked by auditory characteristics; and a fourth step of converting, based on the psychoacoustic model information, the first audio stream information into the second audio stream information having a bit rate lower than the first audio stream information to generate the second audio stream.

In one embodiment of the invention, the quantization of the frequency domain signal is performed to indicate frequency spectrums for respective frequency bands of the frequency domain signal by mantissa parts and exponent parts; each of the exponent parts is a scale factor of each of the frequency spectrums for the respective frequency bands; the third step calculates the psychoacoustic model information based on the scale factors of the frequency spectrums for the respective frequency bands included in quantized information; and the fourth step converts the first audio stream information into the second audio stream information having a bit rate lower than the first audio stream information by reallocating, based on the psychoacoustic model information, the number of bits allocated to the mantissa parts.

In one embodiment of the invention, the quantization of the frequency domain signal is performed to indicate frequency spectrums for respective frequency bands of the frequency domain signal by mantissa parts and exponent parts: each of the exponent parts is a scale factor of each of the frequency spectrums for the respective frequency bands; the third step calculates the psychoacoustic model information based on dequantized frequency spectrums for the respective frequency bands generated by dequantizing the first audio stream information; and the fourth step converts the first audio stream information into the second audio stream information having a bit rate lower than the first audio stream information by reallocating, based on the psychoacoustic model information, the number of bits allocated to the mantissa parts.

In one embodiment of the invention, when performing downmix processing so as to reduce the number of channels of the second audio stream to less than the number of channels of the first audio stream, the third step calculates the psychoacoustic model information based on dequantized frequency spectrums for the respective frequency bands on which downmix processing has been performed.

In still another aspect of the present invention, there is provided a computer-readable recording medium having a program for causing a computer to execute coding processing thereon, in which the coding processing includes: a first step of decoding a first stream signal in which a first video stream including a first video stream information generated by coding a first video signal and a first audio stream including a first audio stream information generated by coding a first audio signal are multiplexed; and a second step of generating, based on the decoded first stream signal, a second video stream including a second video stream information having a bit rate lower than the first video stream information and a second audio stream including a second audio stream information having a bit rate lower than the first audio stream information, and multiplexing the second video stream and the second audio stream to generate a second stream signal, wherein the first audio stream information is obtained by performing a time-frequency conversion on the first audio signal into a frequency domain signal to quantize the frequency domain signal, and the second step includes: a third step of calculating psychoacoustic model information indicating frequency bands of the first audio signal masked by auditory characteristics; and a fourth step of converting, based on the psychoacoustic model information, the first audio stream information into the second audio stream information having a bit rate lower than the first audio stream information to generate the second audio stream.

In one embodiment of the invention, the quantization of the frequency domain signal is performed to indicate frequency spectrums for respective frequency bands of the frequency domain signal by mantissa parts and exponent parts; each of the exponent parts is a scale factor of each of the frequency spectrums for the respective frequency bands; the third step calculates the psychoacoustic model information based on the scale factors of the frequency spectrums for the respective frequency bands included in quantized information; and the fourth step converts the first audio stream information into the second audio stream information having a bit rate lower than the first audio stream information by reallocating, based on the psychoacoustic model information, the number of bits allocated to the mantissa parts.

In one embodiment of the invention, the quantization of the frequency domain signal is performed to indicate frequency spectrums for respective frequency bands of the frequency domain signal by mantissa parts and exponent parts; each of the exponent parts is a scale factor of each of the frequency spectrums for the respective frequency is bands; the third step calculates the psychoacoustic model information based on dequantized frequency spectrums for the respective frequency bands generated by dequantizing the first audio stream information; and the fourth step converts the first audio stream information into the second audio stream information having a bit rate lower than the first audio stream information by reallocating, based on the psychoacoustic model information, the number of bits allocated to the mantissa parts.

In one embodiment of the invention, when performing downmix processing so as to reduce the number of channels of the second audio stream to less than the number of channels of the first audio stream, the third step calculates the psychoacoustic model information based on dequantized frequency spectrums for the respective frequency bands on which downmix processing has been performed.

Thus, the invention described herein makes possible the advantages of providing: a device and a method for coding a signal such that information included in the coded signal can be recorded on a recording medium with a quantity of information which is less than that of the information at the time of transmission, a program for realizing such coding processing, and a recording medium having such a program recorded thereon.

These and other advantages of the present invention will become apparent to those skilled in the art upon reading and understanding the following detailed description with reference to the accompanying figures.

BRIEF DESCRIPTION OF THE DRAWINGS

FIG. 4 is a diagram illustrating a coding device according to Example 2 of the present invention.

DESCRIPTION OF THE PREFERRED EMBODIMENTS

EXAMPLE 1

Figure 1:
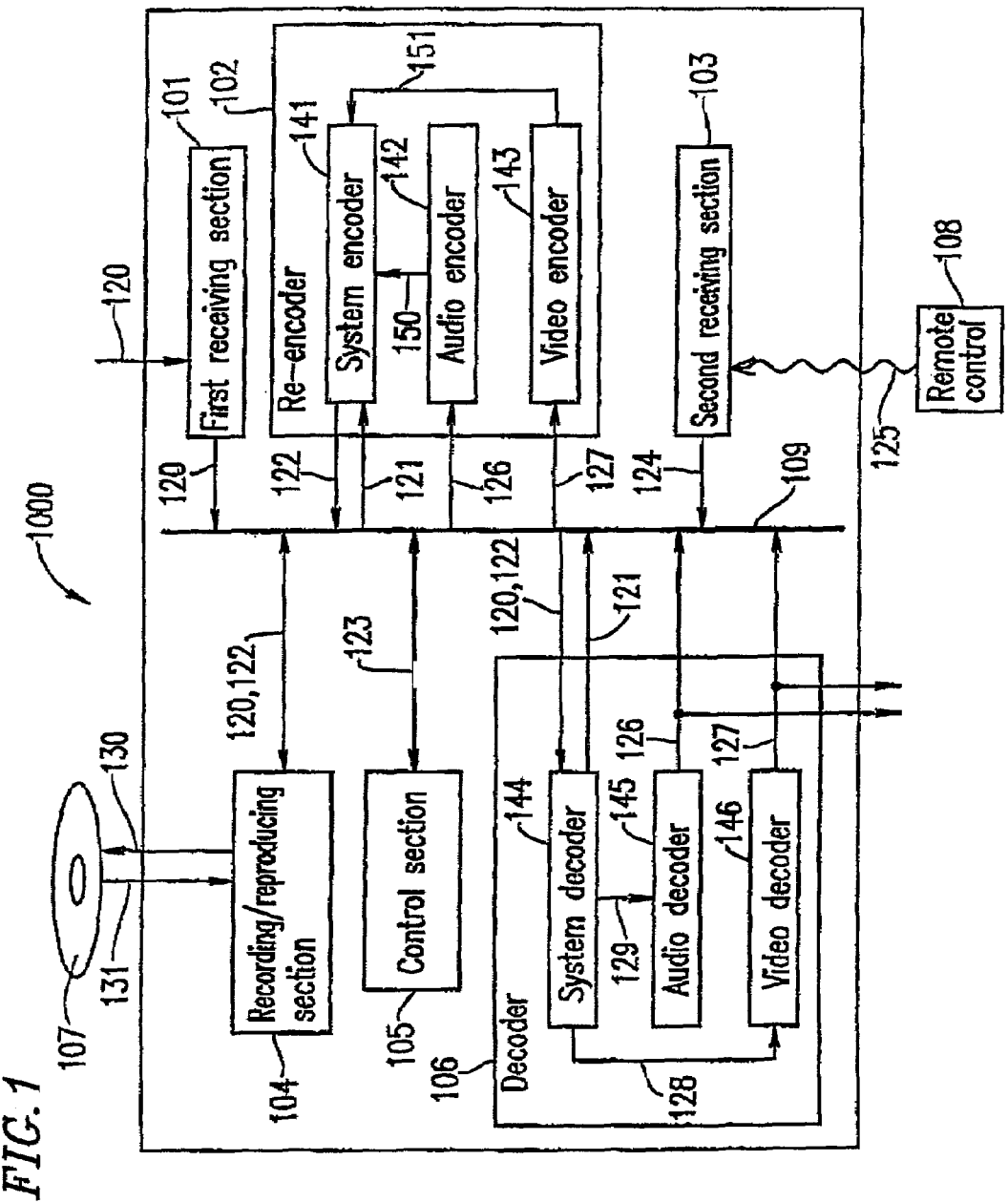
FIG. 1 is a diagram illustrating a coding device according to Example 1 of the present invention.

FIG. 1 illustrates a coding device 1000 according to Example 1 of the present invention.

The coding device 1000 includes: a first receiving section 101 for receiving a coded stream signal 120 supplied by digital satellite broadcasting, an optical disc, etc.; a decoder 106 for decoding the stream signal 120 received by the first receiving section 101 to generate a system information signal 121, a video signal 127, and an audio signal 126; a re-encoder 102 for coding the system information signal 121, the video signal 127, and the audio signal 126 to a stream signal 122 including video and audio information (i.e. video and audio stream information) having a bit rate lower than video and audio information included in the stream signal 120; a recording/reproducing section 104 for recording video, audio and system information included in the stream signal 122 on a recording medium 107 which is an optical disc, etc.; a second receiving section 103 for receiving a radio signal 125 from a remote control 108, etc. and outputting a reception signal 124: a bus 109 for carrying signals for sending and receiving the signals; and a control section 105 for controlling signal processing in the coding device 1000.

The stream signal 120 is, for example, a transport stream (TS) signal sent from a transmission medium such as digital satellite broadcasting or the like, a program stream (PS) signal read from a recording medium, or the like. An example of a structure of the TS signal is illustrated in FIG. 9, and an example of a structure of the PS signal is illustrated in FIG. 10.

Figure 9:
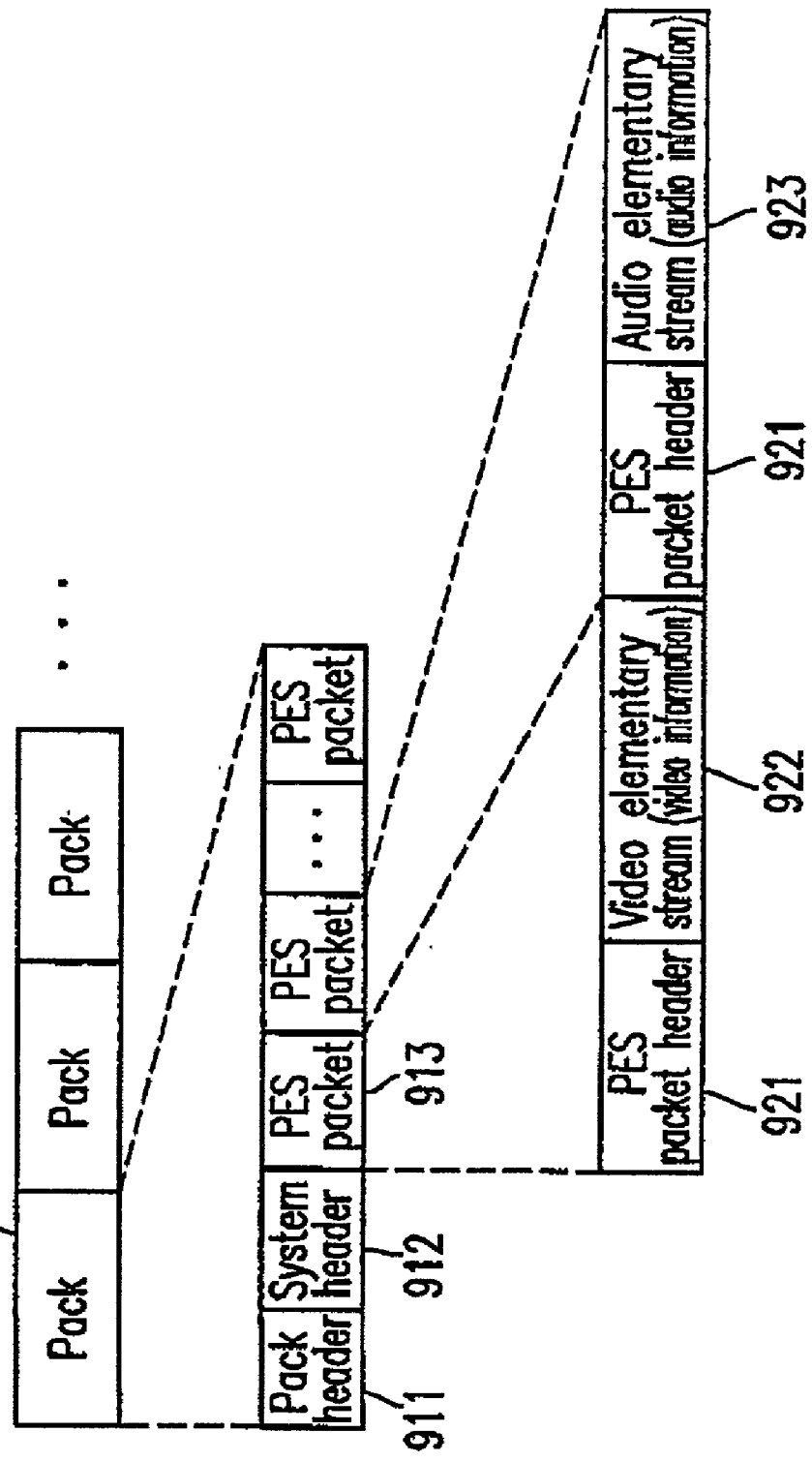
FIG. 9 is a diagram illustrating a structure of a program stream.

Referring to FIG. 9, the PS signal includes a plurality of packs 901 each including a pack header 911, a system header 912, and PES (packetized elementary stream) packets 913. The pack header 911 includes a start code of the pack, SCR (system clock reference), etc. as system information. The system header 912 includes information on a bit rate and a buffer size of each elementary stream, etc. as system information. Each PES packet 913 includes a video elementary stream 922 indicating video information or an is audio elementary stream 923 indicating audio information. A PES packet header 921 is added to each of video and audio elementary streams 922 and 923. The PES packet header 921 includes a code for identifying the elementary stream, a packet size, a PTS (presentation time stamp) and a DTS (decoding time stamp) which are time stamps, information on the number of channels, etc. as system information indicating information specific to a coded signal.

Figure 10:
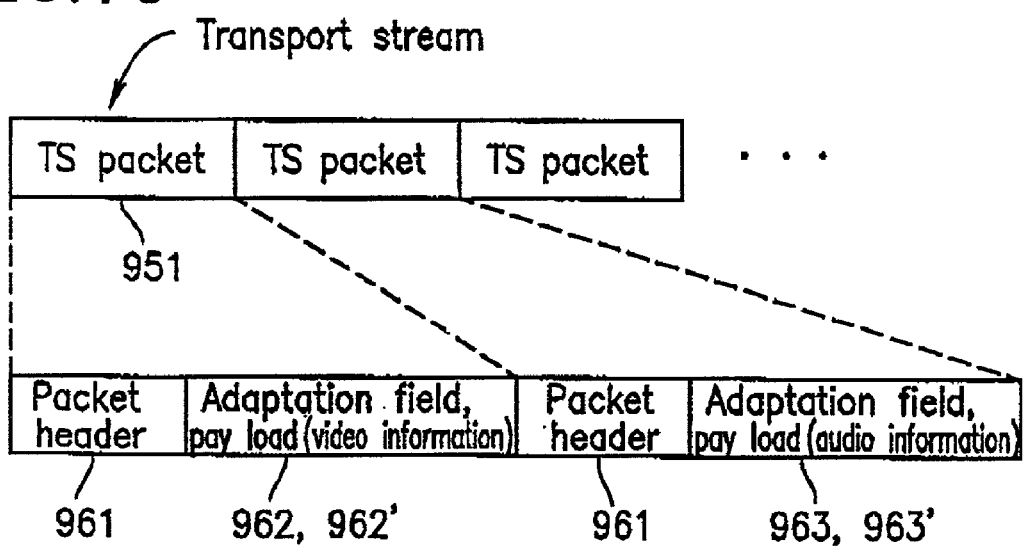
FIG. 10 is a diagram illustrating a structure of a transport stream.

Referring to FIG. 10, the TS signal includes a plurality of TS packets 951. Each TS packet 951 includes at least one of an adaptation field 962 and 963 and a pay load 962' and 963'. The adaptation field 962 and 963 includes a PCR (program clock reference), which is a time stamp, as system information. Each of the pay loads 962' and 963' are either of video or audio information and correspond to the video or audio elementary stream. A packet header 961 is added to each of the adaptation field 962 and 963 and the pay load 962' and 963'. The packet header 961 includes a packet identifier, flag information, information on the number of channels, and a bit rate as system information.

Referring to FIG. 1, in the coding device 1000, as a recording mode for recording information on the recording medium 107, a standard mode or a long mode can be selected. The long mode allows information to be recorded for a longer period of time in comparison to the standard mode. An instruction on which mode is to be used for recording is given to the second receiving section 103 by, for example, the remote control 108. The control section 105 receives the reception signal 124 output from the second receiving section 103 and determines whether a recording is made in the standard mode or in the long mode.

When a recording is made in the standard mode, the stream signal 120 received by the first receiving section 101 is output directly to the recording/reproducing section 120 via the bus 109, and video, audio and system information included in the stream signal 120 is recorded on the recording medium 107 by a laser beam 130.

When a recording is made in the long mode, the stream signal 120 received by the first receiving section 101 is output to the decoder 106.

Figure 2:
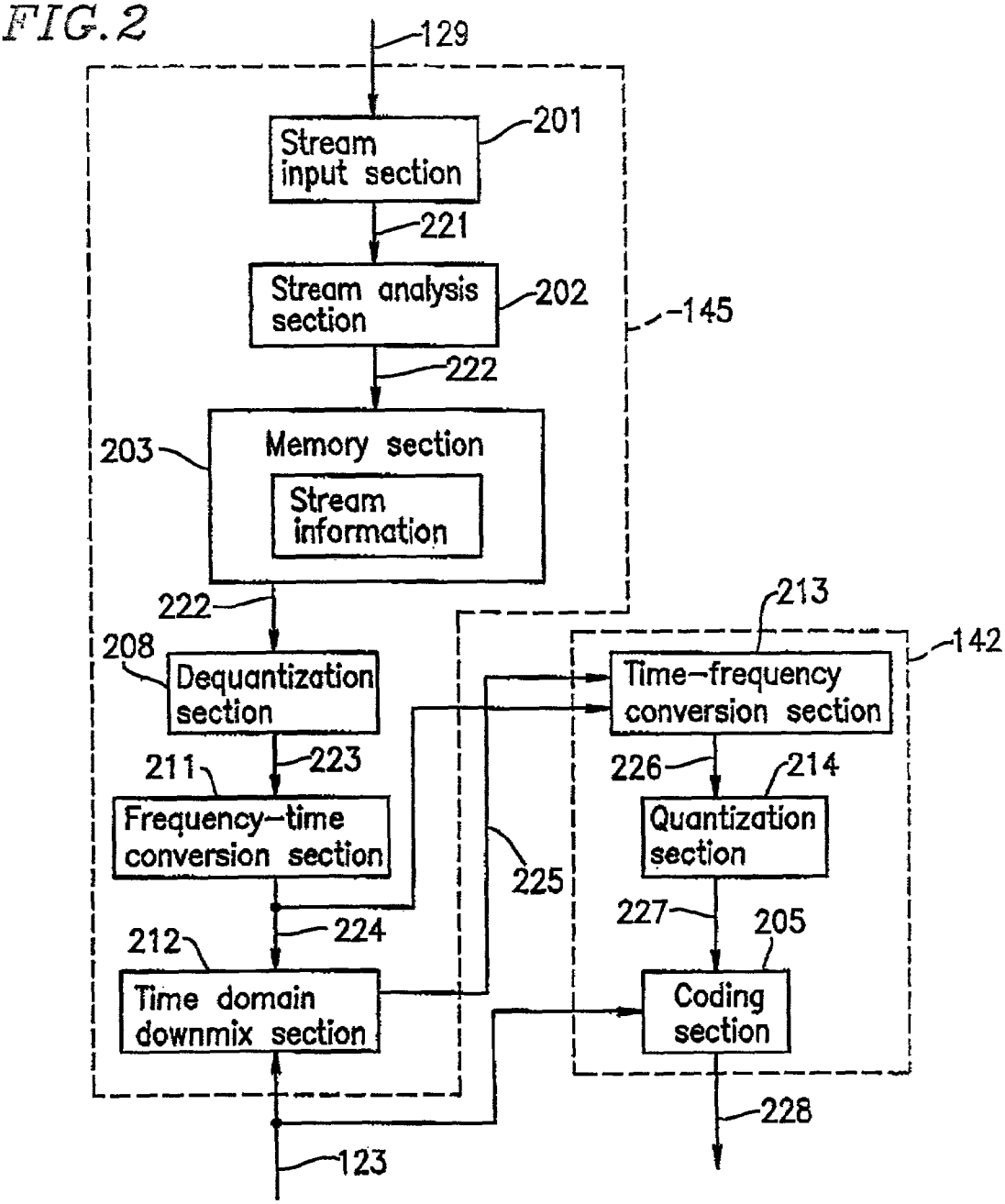
FIG. 2 is a diagram illustrating an audio decoder and a re-encoder of the coding device according to Example 1 of the present invention.
Figure 11:
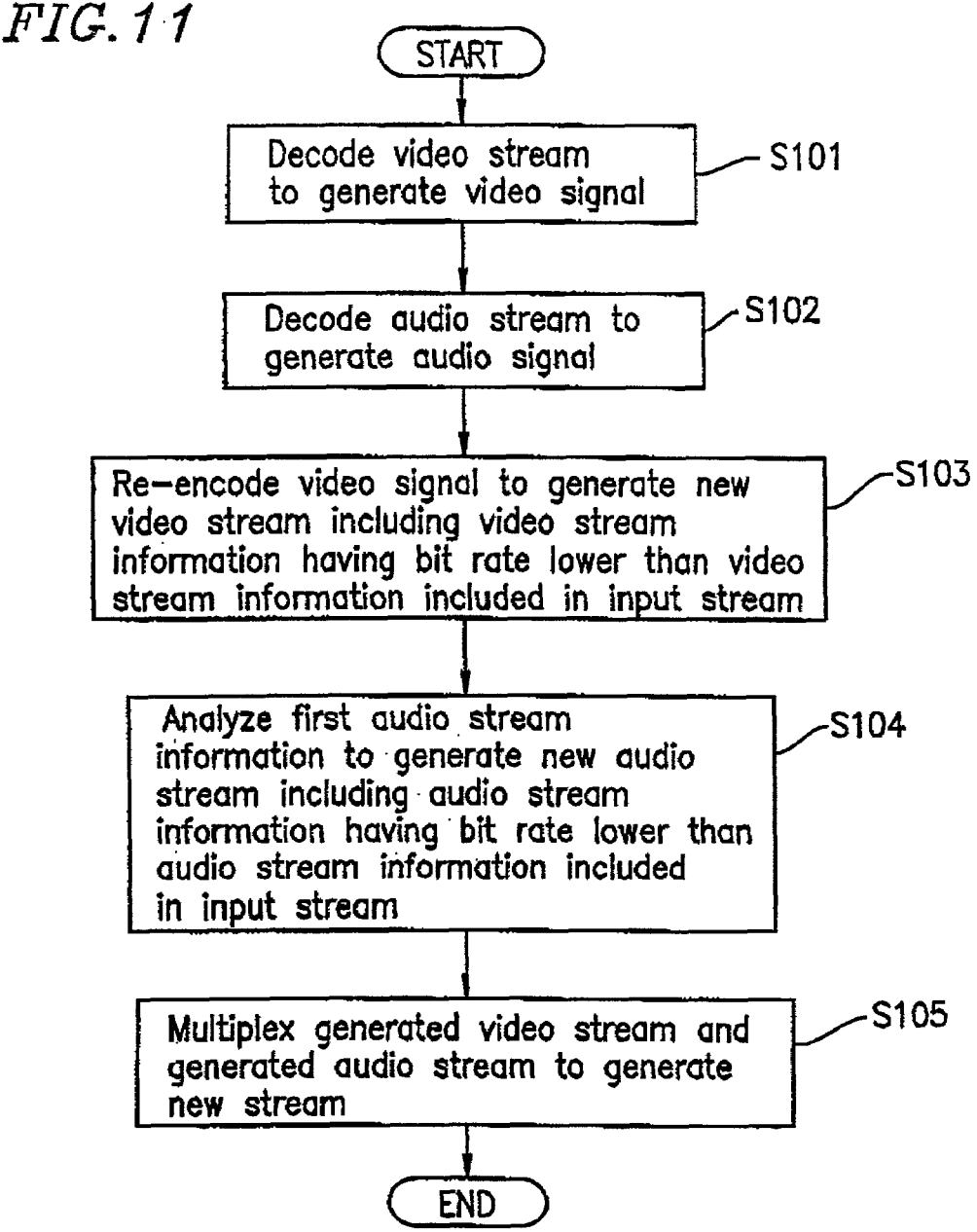
FIG. 11 is a flowchart illustrating an operation of a coding device 1000 according to the present invention.

The respective structures of the decoder 106, the audio decoder 145 and the audio encoder 142, and an operation of the coding device 1000 according to Example 1 will be described below with reference to FIGS. 1, 2 and FIG. 1 is a diagram illustrating the coding device 1000, FIG. 2 is a diagram illustrating the audio decoder 145 and the audio encoder 142 of the coding device 1000, and FIG. 11 is a flowchart illustrating an operation of a coding device 1000.

Referring to FIG. 1, the decoder 106 includes a system decoder 144, an audio decoder 145 and a video decoder 146. The stream signal 120 is first input to the system decoder 144. The input stream signal 120 is separated into a video elementary stream 128, an audio elementary stream 129, and a system information stream by a demultiplexer (not shown) provided in the system decoder 144. The system decoder 144 decodes the system information stream to generate the system information signal 121. The video elementary stream 128 is input to the video decoder 146. The video decoder 146 decodes the video elementary stream 128 to generate a video signal 127 (S101 of FIG. 11). Signal processing in the system decoder 144 and the video decoder 146 is performed using a technique well-known among those skilled in the art, and thus the description thereof is omitted here. The audio elementary stream 129 is input to the audio decoder 145. The audio decoder 145 decodes the audio elementary stream 129 to generate an audio signal 126 (S102 of FIG. 11).

Decoding processing in the audio decoder 145 will be described below with reference to FIG. 2.

Referring to FIG. 2, the audio decoder 145 includes a stream input section 201, a stream analysis section 202, a memory section 203, a dequantization section 208, a frequency-time conversion section 211, and a time domain downmix section 212.

The audio elementary stream 129 is input to the stream input section 201. The stream input section 201 may function as a buffer. The stream input section 201 outputs the audio elementary stream 129 as an input stream signal 221 including audio information. The input stream signal 221 is produced by converting a time series signal into a frequency domain signal, and then quantizing the frequency domain signal into a mantissa part and a scale factor to generate a plurality of quantization signals, and coding the plurality of quantization signals.

More particularly, the input stream signal 221 includes stream information obtained by performing a time-frequency conversion on an audio signal into a frequency domain signal to quantize the frequency domain signal. The quantization of the frequency domain signal is performed to indicate frequency spectrums for respective frequency bands of the frequency domain signal by mantissa parts and exponent parts. Each of the exponent parts is a scale factor of each of the frequency spectrums for the respective frequency bands. The term "frequency band" described herein refers to a scale factor band, a subband, or the like, which is a section of frequency data corresponding to a scale factor.

The stream analysis section 202 analyzes and decodes the input stream signal 221 output from the stream input section 201 to generate a stream information signal 222. The stream information signal 222 includes quantized information such as scale factor information indicating information on an exponent part of a frequency spectrum, information on a mantissa part of the frequency spectrum, bit allocation information indicating the number of bits allocated to the mantissa part, and the like. The stream information signal 222 is stored in the memory section 203. The dequantization section 208 reads the stream information signal 222 from the memory section 203 and dequantizes it to generate a spectrum signal 223 in the form sorted by channels, each channel being further sorted by frequency bands. The frequency-time conversion section 211 converts the spectrum signal 223 into a time axis data signal 224.

When the number of channels is different between the input stream signal 221 and the output stream signal 228, downmix processing is performed. In such a case, the time domain downmix section 212 determines the number of channels based on a control signal 123 from the control section 105. The time domain downmix section 212 performs downmix processing on the time axis data signal 224 such that the number of channels of the time axis data signal 224 is the same as the number of channels of the output stream signal 228. The time axis data signal 224 is converted into a time domain signal 225 by downmix processing. The time domain signal 225 is output as an audio signal 126 to the re-encoder 102.

When the number of channels of the input stream signal 221 is the same as the number of channels of the output stream signal 228, downmix processing is not performed and the time axis data signal 224 is output as an audio signal 126 to the re-encoder 102.

Referring to FIG. 1, the re-encoder 102 includes a system encoder 141, an audio encoder 142, and a video encoder 143. The system information signal 121 is input to the system encoder 141. The audio signal 126 is input to the audio encoder 142. The video signal 127 is input to the video encoder 143.

The system encoder 141 re-creates the system information signal 121 depending on a bit rate, information on the number of channels, information on time, etc. which are changed in the decoder 106 and the re-encoder 102. The video encoder 143 performs coding processing on the video signal 127 using a well-known video compression technique such as MPEG (Moving Picture Experts Group) standards to generate a video elementary stream 151 including video information having a bit rate indicated by the control signal 123 (S103 of FIG. 11). The bit rate indicated by the control signal 123 is lower than that of the video elementary stream 128. By performing coding processing on the video signal 127 so as to achieve the lower bit rate, compressed video information is generated. The Video elementary stream 151 is output to the system encoder 141. Signal processing in the system encoder 141 and the video encoder 143 is performed using a technique well-known among those skilled in the art, and thus the description thereof is omitted here.

Referring to FIG. 2, coding processing of the audio encoder 142 is described. The audio encoder 142 includes a time-frequency conversion section 213, a quantization section 214, and a coding section 205. The time-frequency conversion section 213 receives the time axis data signal 224 or the time domain signal 225 as the audio signal 126 and converts it into a spectrum signal 226.

The quantization section 214 quantizes the spectrum signal 226 to generate a quantization signal 227. The coding section 205 re-encodes the quantization signal 227 so that the quantization signal 227 has a bit rate indicated by the control signal from the control section 105. The bit rate indicated by the control signal 123 is lower than that of the audio elementary stream 129. By re-encoding the quantization signal 227 so as to achieve the lower bit rate, an output stream signal 228 including audio information having a low bit rate is generated (S104 of FIG. 11). The output stream signal 228 is output as an audio elementary stream 150 to the system encoder 141.

Referring to FIG. 1, the audio elementary stream 150, the video elementary stream 151, and the system information signal are combined by a multiplexer (not shown) included in the system encoder 141 to be a stream signal 122 (S105 of FIG. 11). The stream signal 122 may be structured in the format of the program stream or the transport stream described above with reference to FIGS. 9 and 10.

The stream signal 122 is output to the recording/reproducing section 104 via the bus 109, and video, audio and system information included in the stream signal 122 is recorded on the recording medium 107 by the laser beam 130.

The recording/reproducing section 104 receives the laser beam 130 reflected by the recording medium 107 and converts it into the stream signal 120 (or the stream signal 122) to reproduce the video, audio and system information recorded on the recording medium 107. The decoder 106 decodes the stream signal 120 (or the stream signal 122) output from the recording/reproducing section 104 to generate an audio signal 126 and a video signal 127. The audio signal 126 and the video signal 127 are output to external equipment (not shown) and converted into an analog signal by a D/A converter (not shown) and then output to a display (not shown) and speakers (not shown).

According to the present invention, the decoder 106 and the re-encoder 102 may be integrated. In such a case, for example, the decoder 106 and the re-encoder 102 are mounted on the same substrate.

Figure 3:
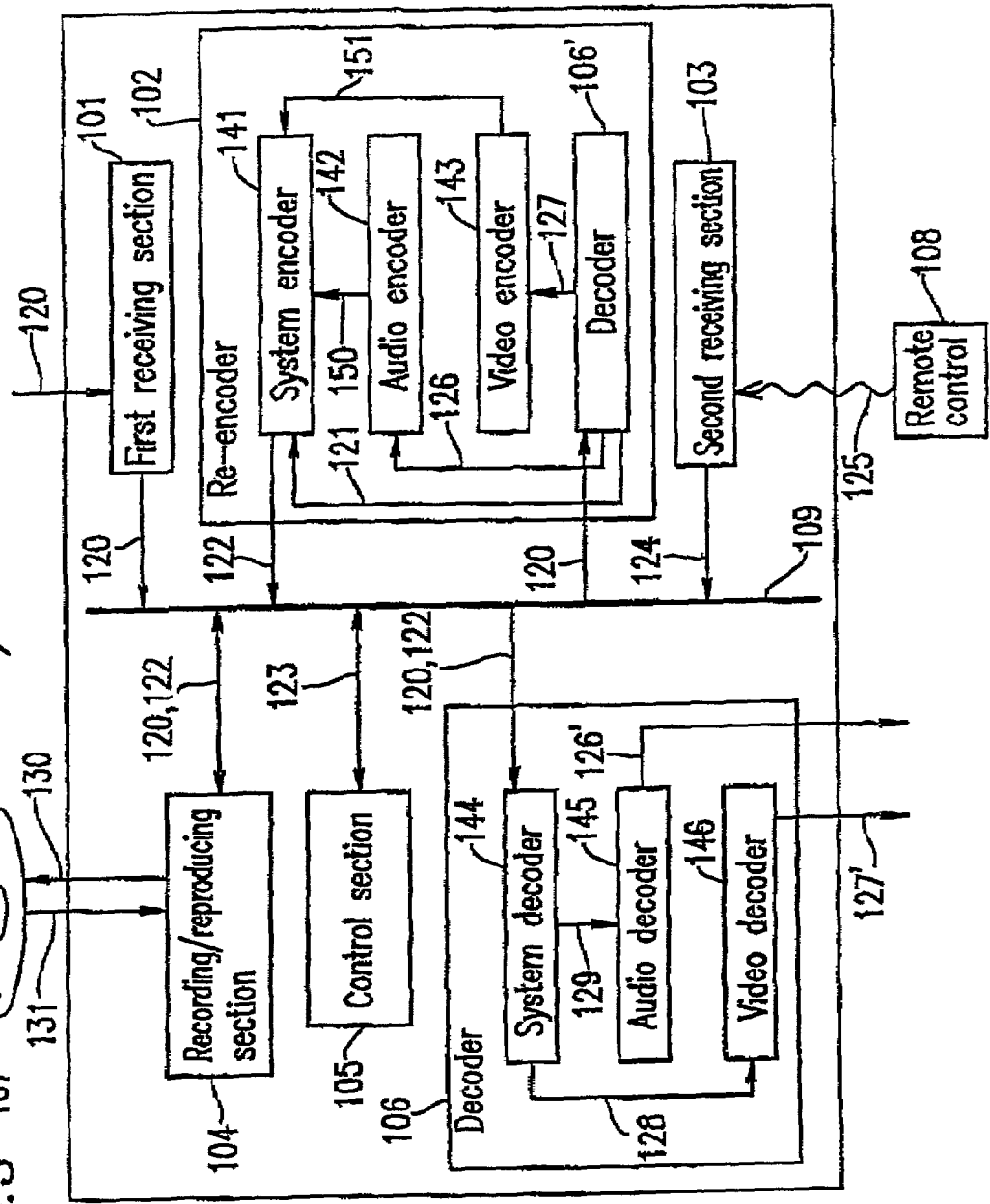
FIG. 3 is a diagram illustrating another coding device according to Example 1 of the present invention.

Alternatively, as in the case of a coding device 1001 illustrated in FIG. 3, a decoder 106' may be provided in the re-encoder 102 in addition to the decoder 106. The decoder 106' includes a system decoder, an audio decoder, and a Video decoder and decodes the stream signal 120 to generate the video signal 127, the audio signal 126 and the system information signal 121. The video signal 127, the audio signal 126 and the system information signal 121 generated by the decoder 106' are input to the video encoder 143, the audio encoder. 142, and the system encoder 141, respectively. The stream signal 122 is generated by performing signal processing in the same manner as described above with respect to the re-encoder 102. The decoder 106 of the coding device 1001 decodes the stream signal 120 or the stream signal 122 output from the recording/reproducing device 104 and outputs an audio signal 126' and a video signal 127' to external equipment (not shown).

As described above, according to Example 1 of the present invention, it is possible to reduce the quantity of information to be recorded on the recording medium 107 by lowering a bit rate of audio information included in the stream signal 120. Therefore, as compared to the case where the information included in the stream signal 120 is recorded in the recording medium 107 as it is, information corresponding to a longer period of time can be recorded in the recording medium 107.

Moreover, by lowering the bit rates of both the video information and the audio information included in the stream signal 120, it is possible to reduce the quantity of information to be recorded on the recording medium 107 in comparison to the case where only a bit rate of the video information is lowered. Therefore, information corresponding to a longer period of time can be recorded in the recording medium 107 in comparison to the case where only the bit rate of the video information is lowered.

Moreover, in addition to lowering the bit rate of the audio information, by performing downmix processing to an audio signal generated by decoding, the quantity of information included in the audio signal can be further reduced, thereby allowing information corresponding to a longer period of time to be recorded on the recording medium 107.

EXAMPLE 2

Example 2 of the present invention will be described below with reference to FIGS. 4, 5A–5D, and 12.

Figure 12:
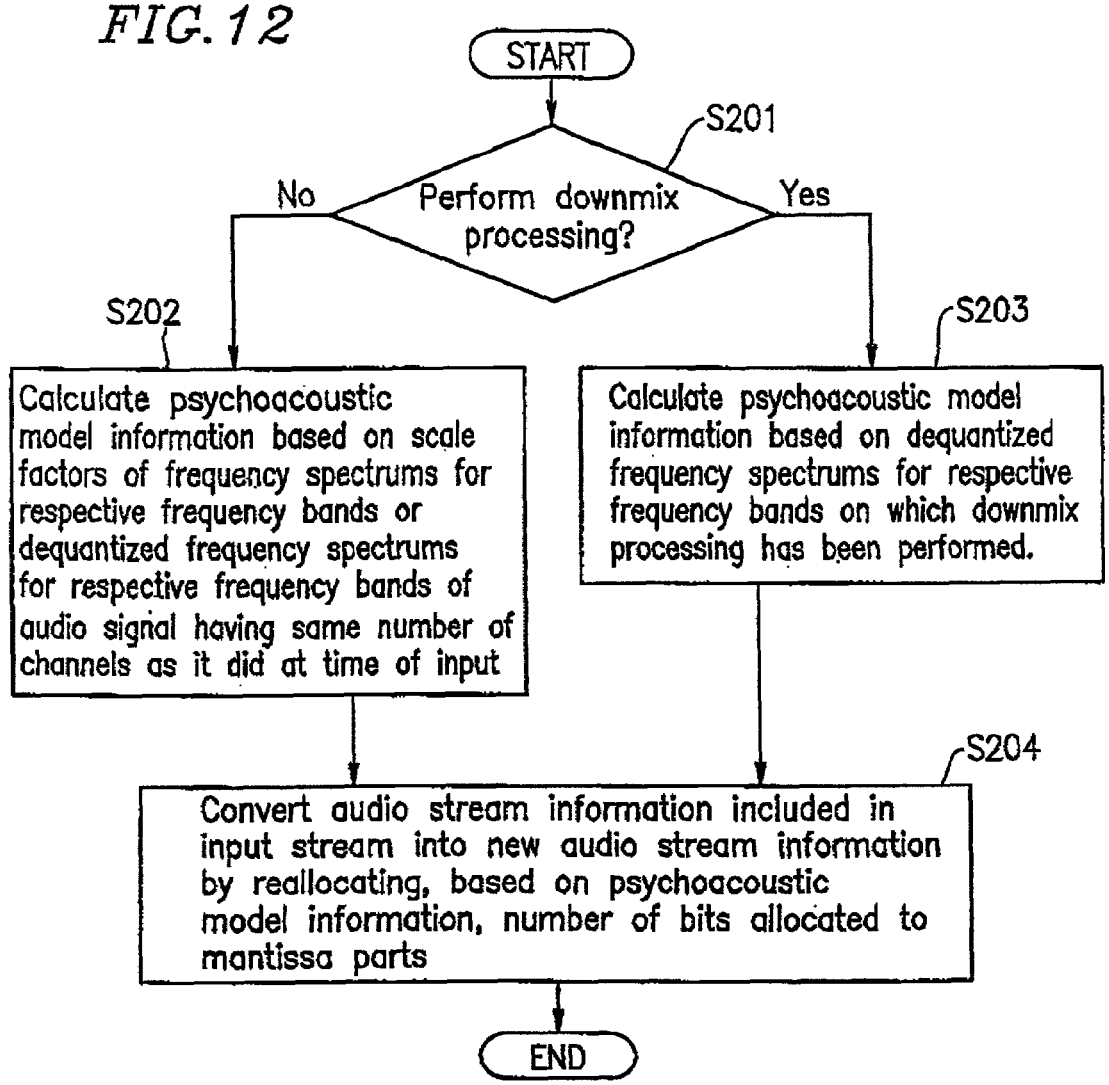
FIG. 12 is a flowchart illustrating coding processing of the audio encoder 402.

FIG. 4 illustrates respective structures of a decoder 401 and an audio encoder 402 according to Example 2 of the present invention, FIGS. 5A–5D are graphs for illustrating a calculation procedure of a psychoacoustic model calculation section, and FIG. 12 is a flowchart illustrating coding processing of the audio encoder 402.

Referring to FIG. 4, the decoder 401 and the audio encoder 402 are provided in the coding device 1000 illustrated in FIG. 1 in place of the audio decoder 145 and the audio encoder 142 illustrated in FIG. 2. In Example 2 of the present invention, the number of channels of an input stream is the same as the number of channels of an output stream. The system decoder 144, the video decoder 146, the system encoder 141 and the video encoder 143 operate in a similar manner as in Example 1.

The audio decoder 401 includes a stream input section 201 and a stream analysis section 202. In a similar manner as in Example 1, the stream input section 201 may function as a buffer. The stream input section 201 outputs the audio elementary stream 129 as an input stream signal 221 including audio information. The stream analysis section 202 analyzes and decodes the input stream signal 221 output from the stream section 201 to generate a stream information signal 222. The stream information signal 222 includes scale factor information indicating information on an exponent part of a frequency spectrum, information on a mantissa part of the frequency spectrum, bit allocation information indicating the number of bits allocated to the mantissa part, etc. The stream information signal 222 is output as the audio signal 126 (FIG. 1) to the audio encoder 402.

Referring to FIG. 4, coding processing performed by the audio encoder 402 will be described. The audio encoder 402 includes a memory section 403, a psychoacoustic model calculation section 404 and a coding section 405. The stream information signal 222 input as the audio signal 126 to the audio encoder 402 is stored in the memory section 403.

The psychoacoustic model calculation section 404 reads the stream information signal 222 from the memory section 403 and calculates a psychoacoustic model using an audio signal included in the stream information signal 222. In general, the psychoacoustic model is calculated using the frequency spectrum information. However, in Example 2, the psychoacoustic model is calculated using the scale factor information instead of using the frequency spectrum information (S201 and S202 of FIG. 12). By using the scale factor information for calculating the psychoacoustic model, it is possible to perform signal processing faster than the case where the frequency spectrum is used.

Figure 5A:
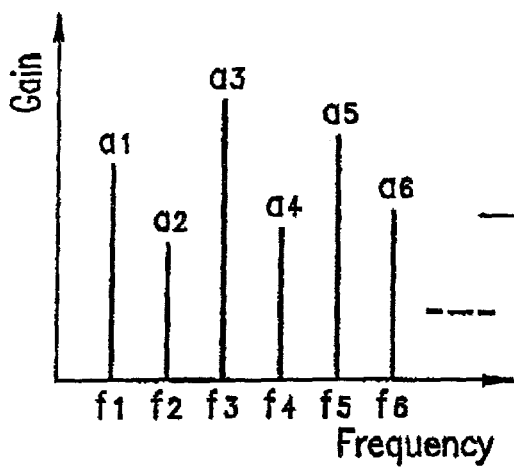
FIG. 5A is a graph for illustrating a calculation procedure of a psychoacoustic model calculation section according to Examples 2 to 4 of the present invention.
Figure 5B:
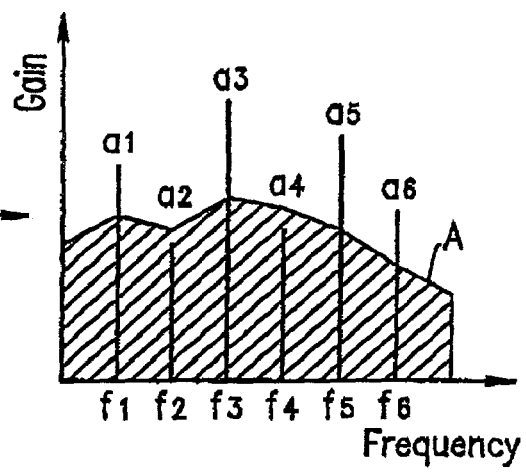
FIG. 5B is a graph for illustrating the calculation procedure of the psychoacoustic model calculation section according to Examples 2 to 4 of the present invention.
Figure 5C:
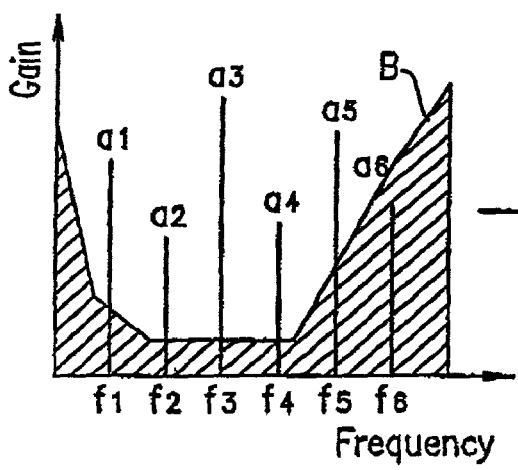
FIG. 5C is a graph for illustrating the calculation procedure of the psychoacoustic model calculation section according to Examples 2 to 4 of the present invention.
Figure 5D:
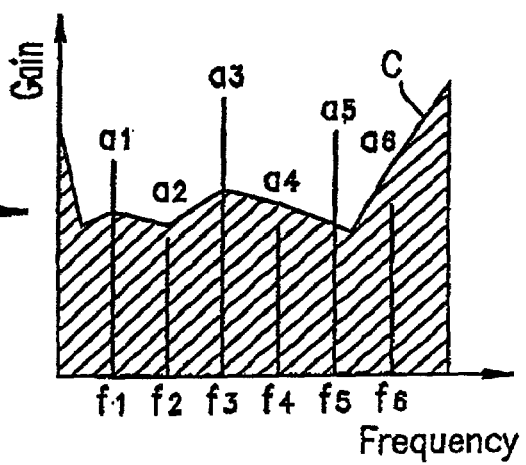
FIG. 5D is a graph for illustrating the calculation procedure of the psychoacoustic model calculation section according to Examples 2 to 4 of the present invention.

Referring to FIGS. 5A to 5D, a procedure for calculating the psychoacoustic model from the stream information included in an audio signal will be described. FIG. 5A illustrates spectrum signals having levels $a_1$, $a_2$, $a_3$, $a_4$, $a_5$, and $a_6$ in the respective frequency bands $f_1$, $f_2$, $f_3$, $f_4$, $f_5$, and $f_6$. Since the levels $a_1$, $a_3$ and $a_5$ of the spectrum signals are relatively high among the levels $a_1$ to $a_6$ of the spectrum signals, an audibility masking curve A illustrated in FIG. 5B is produced. The lowest audible thresholds of a listener generally draw a curve B illustrated in FIG. 5C. By combining the audibility masking curve A and the lowest audible thresholds, an overall masking curve C illustrated in FIG. 5D is produced. The overall masking curve C runs through masking thresholds of the frequency bands $f_1$, $f_2$, $f_3$, $f_4$, $f_5$, and $f_6$. The spectrum signals having the levels $a_2$, $a_4$ and $a_6$ equal to or less than the overall masking curve C (i.e., equal to or less than the masking thresholds) are inaudible to the listener. Therefore, even if the spectrum signals having the levels $a_2$, $a_4$ and $a_6$ are deleted, the rest of the spectrum signals are auditorily the same to the listener. Accordingly, referring to FIG. 4, the psychoacoustic model calculation section 404 outputs to the coding section 405 a psychoacoustic model information signal 421 including psychoacoustic model information which indicates that it is sufficient to output only the spectrum signals $a_1$, $a_3$ and $a_5$.

The spectrum signals included in the psychoacoustic model information signal 421 is converted into a signal in the form indicated as:

$$F^{*}x\Lambda(\alpha^{*}S)$$

in the psychoacoustic model calculation section 404, where F is mantissa part information, S is a scale factor, x is a base of an exponent part, $\alpha$ is a constant, and $\Lambda$ is a symbol of exponentiation.

The psychoacoustic model calculation section 404 according to Example 2 calculates, as the psychoacoustic model, the overall masking curve C based on values of the scale factors $S_1$, $S_3$ and $S_5$ corresponding to the levels $a_1$, $a_3$ and $a_5$ of the spectrum signals included in the stream information signal 222. The psychoacoustic model information signal 421 including such psychoacoustic model information is output to the coding section 405.

The coding section 405 determines an allocation of bits to each frequency band according to the overall masking curve C. The allocation of bits is performed using any method. For example, the allocation of bits to each frequency are determined from SMR (spectrum to masking ratio), which is a ratio of each spectrum signal to the overall masking curve C, and a bit rate. The coding section 405 estimates the number of bits of mantissa part information F of the spectrum signals according to the determined bit allocation. The bit rate designated by bit rate information can have any value in a range defined by a coding method. The coding section 405 re-encodes the stream information signal 222, based on the calculated psychoacoustic model and bit rate information indicated by a control signal 123 output from the control section 105 (FIG. 1), such that an average bit rate is a designated bit rate, thereby generating an output stream signal 422 (S204 of FIG. 12). The bit rate indicated by the control signal 123 is lower than a bit rate of the audio stream signal 129. By re-encoding the stream information signal 222 so as to have such a low bit rate, the output stream signal 422 including audio information having a low bit rate is generated as an audio stream signal 150.

In a similar manner as in Example 1, the audio elementary stream 150, the video elementary stream 151, and the system information signal are combined by the multiplexer included in the system encoder 141 to be the stream signal 122.

Referring to FIGS. 1 and 4, the stream signal 122 is output to the recording/reproducing section 104 via the bus 109, and the video and audio information included on the stream signal 122 is recorded in the recording medium 107 by the laser beam 130.

In Example 2, signal processing such as a frequency-time conversion, a time-frequency conversion, dequantization, and quantization are not performed. Therefore, the frequency-time conversion section 211, the time-frequency conversion section 213, the dequantization section 208, the quantization section 214, and the memory section 203 illustrated in FIG. 2 can be omitted. The audio information included in the input stream signal 221 and the audio information included in the output stream signal 422 are information obtained by coding a frequency domain signal and they only differ in bit rate. Therefore, temporal delay in auditory sensation and a phase shift do not occur between them.

As described above, according to the audio decoder 401 and the audio encoder 402 of Example 2, the coding section 405 re-encodes the input stream information without performing dequantization processing. This reduces an amount of signals to be processed and a memory capacity required for the signal processing in comparison to the ease where the audio decoder 145 and the audio encoder 142 according to Example 1 are used. Moreover, it is possible to generate a coded signal having a low bit rate which does not cause temporal delay and a phase shift.

Example 2 of the present invention realizes the coding device 400, for performing coding processing of audio information, which includes the audio decoder 401 and the audio encoder 402. The audio stream signal 129 is input to the coding device 400 and is processed by the decoder 401 and the audio encoder 402 in the above-described manner. Thus, the output stream signal 422 including audio information having a bit rate lower than that of audio information included in the audio stream signal 129 is generated. The output stream signal 422 is output as the audio stream signal 150 from the coding device 400.

EXAMPLE 3

Figure 6:
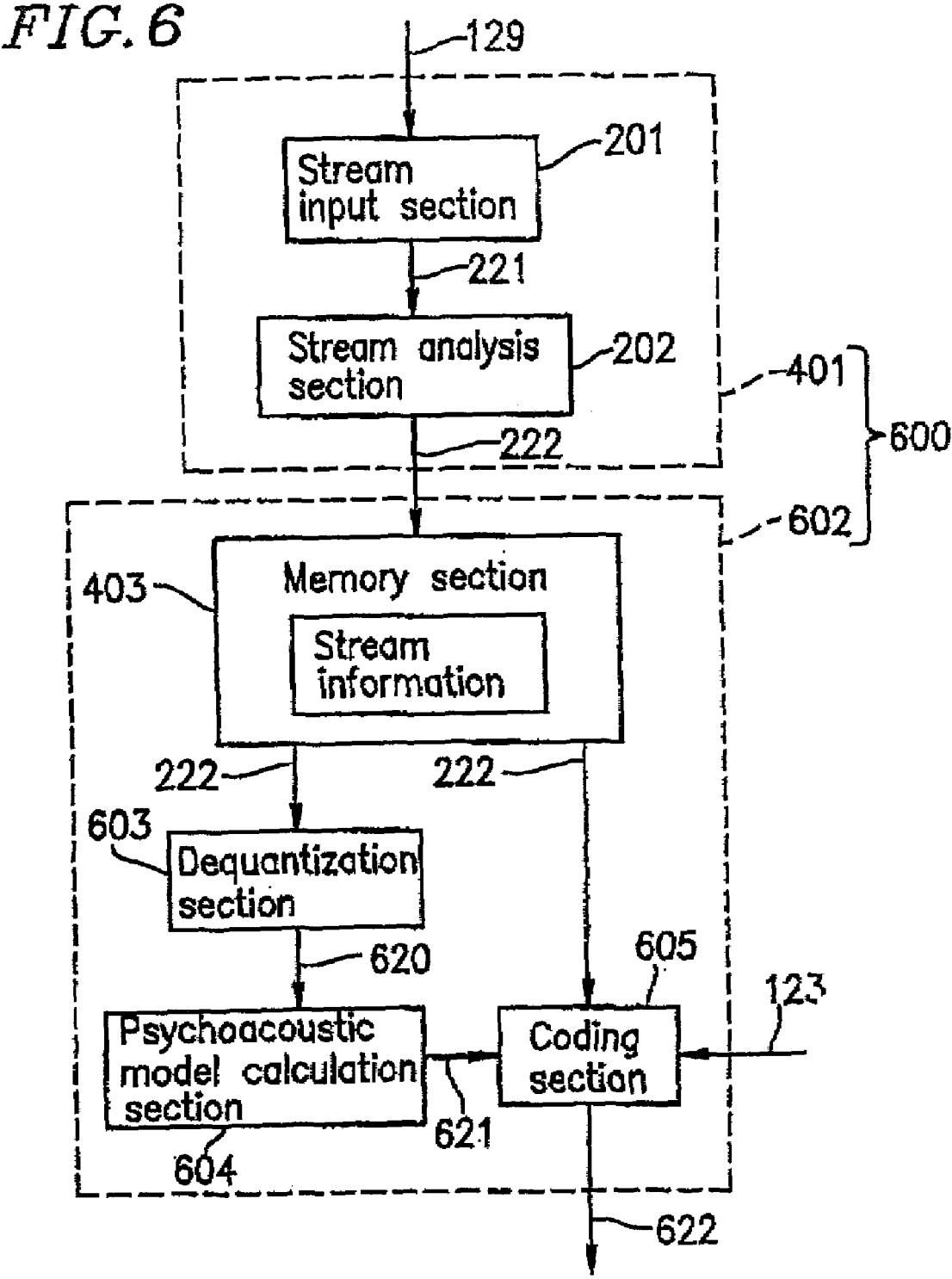
FIG. 6 is a diagram illustrating a coding device according to Example 3 of the present invention.

FIG. 6 illustrates respective structures of the audio decoder 401 and an audio encoder 602 according to Example 3 of the present invention. The audio decoder 401 and the audio encoder 602 are provided in the coding device 1000 illustrated in FIG. 1 in place of the audio decoder 145 and the audio encoder 142 illustrated in FIG. 2. In Example 3 of the present invention, the number of channels of an input stream is the same as the number of channels of an output stream. The system decoder 144, the video decoder 146, the system encoder 141, and the video encoder 143 operate in a similar manner as in Example 1.

Referring to FIGS. 1 and 6, as described in Example 2, the audio decoder 401 outputs the stream information signal 222 as the audio signal 126 to the audio encoder 602.

Referring to FIGS. 6 and 12, coding processing performed by the audio encoder 602 will be described. The audio encoder 602 includes the memory section 403, a dequantization section 603, the psychoacoustic model calculation section 404 and the coding section 405. The stream information signal 222 input to the audio encoder 602 is stored in the memory section 403.

The dequantization section 603 receives scale factor information and mantissa part information included in the stream information signal 222 from the memory section 403, and performs dequantization on the information so as to generate a spectrum signal 620 for each channel. The psychoacoustic model calculation section 604 calculates a psychoacoustic model using the spectrum signal 620 for each of frequency bands of the respective channels (S201 and S202 of FIG. 12). In Example 3 of the present invention, the overall masking curve C illustrated in FIG. 5D is produced from the spectrum signal 620 itself. The psychoacoustic model produced by this procedure is even more precise in comparison to the psychoacoustic model according to Example 2. The psychoacoustic model calculation section 604 outputs a psychoacoustic model information signal 621 including the psychoacoustic model information to the coding section 605.

The coding section 605 re-encodes the stream information signal 222, based on the psychoacoustic model information and bit rate information indicated by the control signal 123, such that an average bit rate is a designated bit rate, thereby generating an output stream signal 622 (S204 of FIG. 12) The bit rate indicated by the control signal 123 can have any value in a range defined by a coding method. The bit rate indicated by the control signal 123 is lower than a bit rate of the audio stream signal 129. By re-encoding the stream information signal 222 so as to have such a bit rate or a lower bit rate, the output stream signal 622 including compressed audio information is generated as the audio elementary stream 150.

In a similar manner as in Example 1, the audio elementary stream 150, the video elementary stream 151, and the system information signal are combined by the multiplexer included in the system encoder 141 to be the stream signal 122.

Referring to FIGS. 1 and 6, the stream signal 122 is output to the recording/reproducing section 104 via the bus 109, and video, audio and system information included in the stream signal 122 is recorded in the recording medium 107 by the laser beam 130.

In the coding device 600 according to Example 3, signal processing such as a frequency-time conversion, a time-frequency conversion and quantization are not performed. Therefore, the frequency-time conversion section 211, the time-frequency conversion section 213, the quantization section 214, and the memory section 203 illustrated in FIG. 2 can be omitted. The audio information included in the input stream signal 221 and the audio information included in the output stream signal 622 are obtained by coding a frequency domain signal and only differ in bit rate. Therefore, temporal delay in auditory sensation and a phase shift do not occur between them.

As described above, according to the audio decoder 401 and the audio encoder 602 of Example 3, the coding section 605 re-encodes the input stream information 222 on which dequantization processing is not performed. This reduces an amount of signals to be processed and a required memory capacity for the signal processing in comparison to the case where the audio decoder 145 and the audio encoder 142 according to Example 1 are used. Moreover, it is possible to generate the output stream signal 622 having a low bit rate which does not cause temporal delay and a phase shift.

Example 3 of the present invention realizes the coding device 600, for performing coding processing of audio information, which includes the audio decoder 401 and the audio encoder 602. The audio stream signal 129 is input to the coding device 600 and processed by the audio decoder 401 and the audio encoder 602 in the above-described manner. Thus, the output stream signal 622 including audio information having a bit rate lower than that of audio information included in the audio stream signal 129 is generated. The output stream signal 622 is output as the audio stream signal 150 signal from the coding device 600.

EXAMPLE 4

Figure 7:
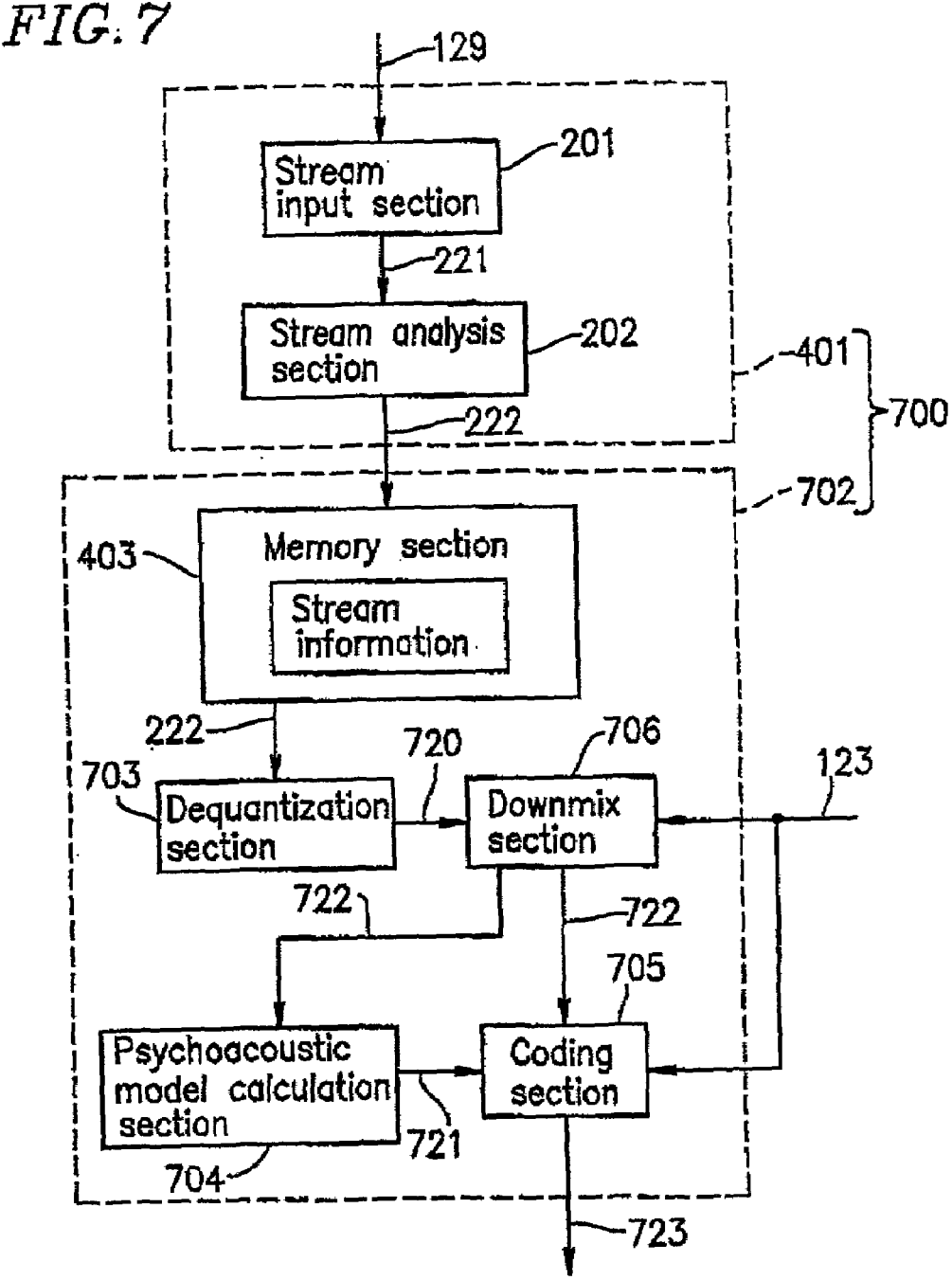
FIG. 7 is a diagram illustrating a coding device according to Example 4 of the present invention.

FIG. 7 illustrates respective structures of the audio decoder 401 and an audio encoder 702 according to Example 4 of the present invention. The audio decoder 401 and the audio encoder 702 are provided in the coding device 1000 illustrated in FIG. 1 in place of the audio decoder 145 and the audio encoder 142 illustrated in FIG. 2. In Example 4 of the present invention, the number of channels may be different between an input stream and an output stream. The system decoder 144, the video decoder 146, the system encoder 141 and the video encoder 143 operate in a similar manner as in Example 1.

As described in Example 2, the audio decoder 401 outputs the stream information signal 222 as the audio signal 126 to the re-encoder 102.

Referring to FIGS. 7 and 12, coding processing performed by the audio encoder 702 will be described. The audio encoder 702 includes the memory section 403, a dequantization section 703, a psychoacoustic model calculation section 704 and a coding section 705. The stream information signal 222 input to the audio encoder 702 is stored in the memory section 403.

The dequantization section 703 receives scale factor information and mantissa part information included in the stream information signal 222 from the memory section 403 and performs dequantization to the information so as to generate a spectrum signal 720 for each channel.

A downmix section 706 downmixes the spectrum signal 720 generated by the dequantization section 703 such that the number of channels of the spectrum signal 720 is reduced to the number of output channels indicated by the control signal 123. Here, an input stream is formed of, for example, five channels of L, R, C, SL and SR, and an output stream is formed of, for example, two channels of L and R. In this case, downmix processing can be represented by the following expressions (1) and (2):

$$L=\beta(L+CMIX*C+SMIX*SL) \quad \text{expression (1)}$$

$$R=\beta(R+CMIX*C+SMIX*SR) \quad \text{expression (2)}$$

Here, $\beta$ is a normalizing coefficient, which is required to be set to a value so as not to cause L and R to overflow. CMIX and SMIX are arbitrary coefficients. The expressions used for the downmix processing are not limited to the expressions (1) and (2). The downmix processing may be performed using expressions other than these expressions.

After downmixing the frequency spectrum of the input stream so as to have the same number of channels as the number of the output channel of the frequency spectrum in the above-described manner, the psychoacoustic model calculation section 704 calculates the psychoacoustic model using a downmixed spectrum signal 722 for each frequency band (S201 and S203 of FIG. 12). The psychoacoustic model calculation section 704 produces the overall masking curve C illustrated in FIG. 5D from the spectrum signal 722 itself. The psychoacoustic model produced by this procedure is even more precise in comparison to the psychoacoustic model according to Example 2. The psychoacoustic model calculation section 704 outputs a psychoacoustic model information signal 721 including the psychoacoustic model information to the coding section 705.

The coding section 705 re-encodes the stream information signal 222, based on the psychoacoustic model information and bit rate information indicated by the control signal 123, such that an average bit rate is a designated bit rate, thereby generating an output stream signal 723 (S204 of FIG. 12). The bit rate indicated by the control signal 123 can have any value in a range defined by a coding method. The bit rate indicated by the control signal 123 is lower than a bit rate of the audio stream signal 129. By re-encoding the stream information signal 222 so as to have such a bit rate or a lower bit rate, the output stream signal 723 including compressed audio information is generated as the audio stream signal 150.

In a similar manner as in Example 1, the audio elementary stream 150, the video elementary stream 151, and the system information signal are combined by the multiplexer included in the system encoder 141 to be the stream signal 122.

Referring to FIGS. 1 and 7, the stream signal 122 is output to the recording/reproducing section 104 via the bus 109, and the video, audio and system information included in the stream signal 122 is recorded on the recording medium 107 by the laser beam 130.

In the coding device 700 according to Example 4, signal processing such as a frequency-time conversion, a time-frequency conversion and quantization are not performed. Therefore, the frequency-time conversion section 211, the time-frequency conversion section 213, the quantization section 214, and the memory section 203 illustrated in FIG. 2 can be omitted. The audio information included in the input stream signal 221 and the audio information included in the output stream signal 723 are obtained by coding a frequency domain signal and only differ in bit rate. Therefore, temporal delay in auditory sensation and a phase shift do not occur between them.

As described above, according to the audio decoder 401 and the audio encoder 702 of Example 4, the coding section 705 re-encodes the spectrum signal 722 output from the downmix section 706. This reduces an amount of signals to be processed and a required memory capacity for the signal processing in comparison to the case where the audio decoder 145 and the audio encoder 142 according to Example 1 are used. Moreover, it is possible to generate the output stream signal 723 having the decreased number of channels and a low bit rate which does not cause temporal delay and a phase shift.

Example 4 of the present invention realizes the coding device 700, for performing coding processing of audio information, which includes the audio decoder 401 and the audio encoder 702. The audio stream signal 129 is input to the coding device 700 and processed by the audio decoder 401 and the audio encoder 702 in the above-described manner.

Thus, the output stream signal 723 including audio information having a bit rate lower than that of audio information included in the audio stream signal 129 is generated. The output stream signal 723 is output as the audio stream signal 150 from the coding device 700.

The above-described coding processing according to Examples 1 to 4 of the present invention may be recorded on a recording medium in the form of a program. As the recording medium, any type of computer-readable recording medium such as a floppy disc or CD-ROM can be used. By installing the coding processing program which is read from the recording medium in any computer which can input and output a digital signal such as a stream signal, the computer can be caused to function as a coding processing device. In this case, coding processing may be executed by a coding processing means which is incorporated in or connected to the computer. A computer may execute at least a part of the coding processing on software.

Figure 8:
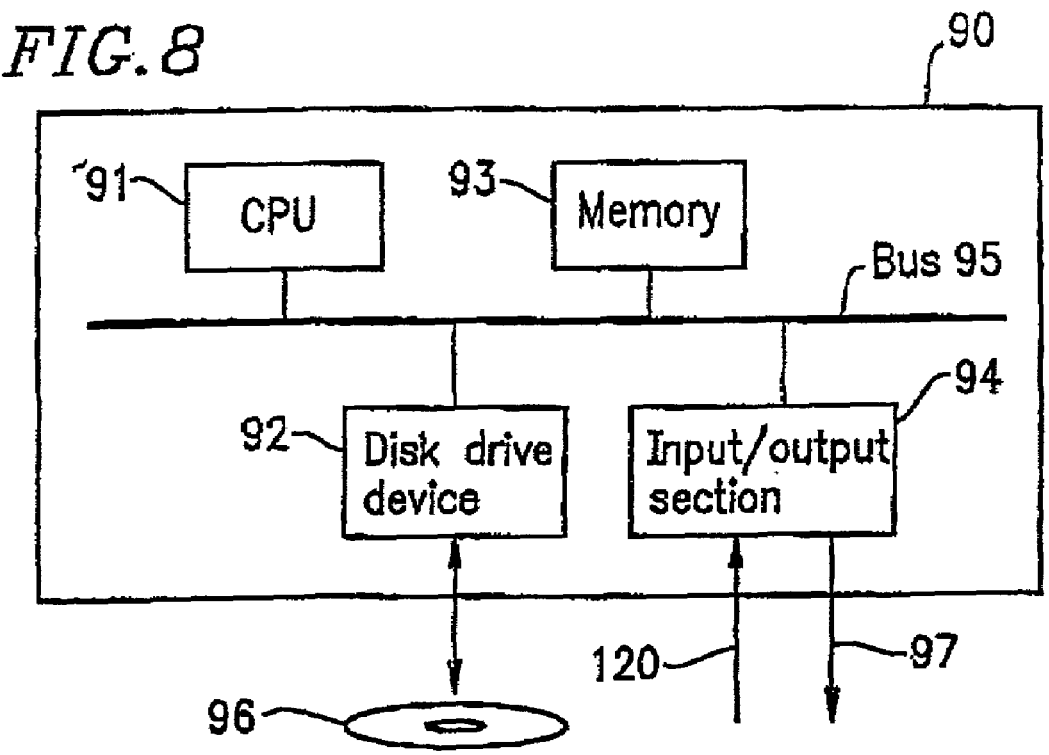
FIG. 8 is a diagram illustrating a computer for performing coding processing according to the present invention.

FIG. 8 illustrates one example of a computer which executes such coding processing. A computer 90 includes a CPU 91, a disc drive device 92 for reading a program for causing the computer 90 to execute the coding processing stored in a recording disc 96, a memory 93 for storing the program read by the disc drive device 92, an input/output section 94 for inputting/outputting a stream signal 97 generated by coding the stream signal 120 and the audio stream signal 129, and a bus 95. In the computer 90, the coding processing according to Examples 1 to 4 are executed by the CPU 91 and the memory 93. The memory 93 may be a hard disc or the like. The stream signal 97 generated by the computer 90 may be stored in the memory 93 or may be recorded in a recording medium installed on the disc drive device 92.

The program may be provided by a recording medium such as the recording disc 96 or may be provided by data distribution via the Internet, etc.

According to the present invention, a video signal and an audio signal generated by decoding a stream signal is coded to generate a coded signal including video and audio information having a bit rate lower than video and audio information included in the stream signal. By lowering the bit rates of the video signal and the audio signal, it is possible to reduce the quantity of information to be recorded in a recording medium in comparison to the case where only a bit rate of the video information is lowered. Therefore, information corresponding to a longer period of time can be recorded on the recording medium in comparison to the case where only the bit rate of the video information is lowered.

According to the present invention, a stream information signal generated by decoding a stream signal is coded based on a psychoacoustic model, thereby generating a coded signal including audio information having a bit rate lower than audio information included in the stream signal. In this case, the coded signal is generated by re-encoding the stream information signal without performing processing such as a frequency-time conversion processing, a time-frequency conversion, dequantization, and quantization. In this manner, in addition to lowering the bit rate of the audio information, by directly coding the stream information signal without converting an input stream signal into a time domain signal and re-encoding the converted signal, an amount of signals to be processed and a memory capacity required for the coding processing are reduced. Therefore, a larger amount of content or audio information for a greater number of programs can be recorded on a recording medium with a fixed recording capacity. The audio information included in the input stream signal and the audio information included in the output stream signal are obtained by coding a frequency domain signal and only differ in bit rate, and thus temporal delay in auditory sensation and a phase shift do not occur between them. Accordingly, it is possible to generate an output stream signal having a low bit rate which does not cause temporal delay and a phase shift.

According to the present invention, a psychoacoustic model is calculated using a spectrum signal generated by dequantizing a stream information signal, which is generated by decoding a stream signal. The stream information signal is coded based on the calculated psychoacoustic model to generate a coded signal including audio information having a bit rate lower than audio information included in the stream signal. In this manner, in addition to lowering the bit rate of the audio information, by calculating the psychoacoustic model using the dequantized spectrum signal, a psychoacoustic model which is highly precise can be obtained. Moreover, a coded signal is generated by re-encoding an input stream information without performing processing such as a frequency-time conversion, a time-frequency conversion, and quantization. This reduces an amount of signals to be processed and a memory capacity required for the coding processing.

According to the present invention, a stream information signal generated by decoding a stream signal is dequantized and downmixed to generate a spectrum signal. A psychoacoustic model is calculated using the generated spectrum signal. The stream information signal is coded based on the calculated psychoacoustic model to generate a coded signal including audio information having a bit rate lower than audio information included in the stream signal. In this manner, in addition to lowering the bit rate of the audio information, by downmixing the stream information signal, the quantity of information included in the coded signal can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A coding device, comprising:
   a decoder for decoding a first stream signal in which a first video stream including a first video stream information generated by coding a first video signal and a first audio stream including a first audio stream information generated by coding a first audio signal are multiplexed; and
   a re-encoder for generating, based on the decoded first stream signal, a second video stream including a second video stream information having a bit rate lower than the first video stream information and a second audio stream including a second audio stream information having a bit rate lower than the first audio stream information, and multiplexing the second video stream and the second audio stream to generate a second stream signal, wherein
   the first audio stream information is obtained by performing a time-frequency conversion on the first audio signal into a frequency domain signal to quantize the frequency domain signal;
   the re-encoder calculates psychoacoustic model information indicating frequency bands of the first audio signal masked by auditory characteristics;
   the re-encoder converts, based on the psychoacoustic model information, the first audio stream information into the second audio stream information having a bit rate lower than the first audio stream information to generate the second audio stream; and
   the re-encoder calculates the psychoacoustic model information based on the quantized information.

2. A coding device according to claim 1, wherein:
   the quantization of the frequency domain signal is performed to indicate frequency spectrums for respective frequency bands of the frequency domain signal by mantissa parts and exponent parts;
   each of the exponent parts is a scale factor of each of the frequency spectrums for the respective frequency bands;
   the re-encoder calculates the psychoacoustic model information based on the scale factors of the frequency spectrums for the respective frequency bands included in the quantized frequency information; and
   the re-encoder converts the first audio stream information into the second audio stream information having a bit rate lower than the first audio stream information by reallocating, based on the psychoacoustic model information, the number of bits allocated to the mantissa parts.

3. A coding device according to claim 1, wherein:
   the quantization of the frequency domain signal is performed to indicate frequency spectrums for respective frequency bands of the frequency domain signal by mantissa parts and exponent parts;
   each of the exponent parts is a scale factor of each of the frequency spectrums for the respective frequency bands;
   the re-encoder calculates the psychoacoustic model information based on dequantized frequency spectrums for the respective frequency bands generated by dequantizing the first audio stream information; and
   the re-encoder converts the first audio stream information into the second audio stream information having a bit rate lower than the first audio stream information by reallocating, based on the psychoacoustic model information, the number of bits allocated to the mantissa parts.

4. A coding device according to claim 3, wherein when performing downmix processing so as to reduce the number of channels of the second audio stream to less than the number of channels of the first audio stream, the re-encoder calculates the psychoacoustic model information based on dequantized frequency spectrums for the respective frequency bands on which downmix processing has been performed.

5. A coding device according to claim 1, further comprising:
a receiving section for receiving the first stream signal,
a control section for indicating to the re-encoder bit rates of the second video stream information and the second audio stream information, and
a recording section for recording the second stream signal on a recording medium.

6. A coding method, comprising:
a first step of decoding a first stream signal in which a first video stream including a first video stream information generated by coding a first video signal and a first audio stream including a first audio stream information generated by coding a first audio signal are multiplexed; and
a second step of generating, based on the decoded first stream signal, a second video stream including a second video stream information having a bit rate lower than the first video stream information and a second audio stream including a second audio stream information having a bit rate lower than the first audio stream information, and multiplexing the second video stream and the second audio stream to generate a second stream signal, wherein
the first audio stream information is obtained by performing a time-frequency conversion on the first audio signal into a frequency domain signal to quantize the frequency domain signal, and
the second step includes:
a third step of calculating psychoacoustic model information based on the quantized information indicating frequency bands of the first audio signal masked by auditory characteristics; and
a fourth step of converting, based on the psychoacoustic model information, the first audio stream information into the second audio stream information having a bit rate lower than the first audio stream information to generate the second audio stream.

7. A coding method according to claim 6, wherein:
the quantization of the frequency domain signal is performed to indicate frequency spectrums for respective frequency bands of the frequency domain signal by mantissa parts and exponent parts;
each of the exponent parts is a scale factor of each of the frequency spectrums for the respective frequency bands;
the third step calculates the psychoacoustic model information based on the scale factors of the frequency spectrums for the respective frequency bands included in quantized information; and
the fourth step converts the first audio stream information into the second audio stream information having a bit rate lower than the first audio stream information by reallocating, based on the psychoacoustic model information, the number of bits allocated to the mantissa parts.

8. A coding method according to claim 6, wherein:
the quantization of the frequency domain signal is performed to indicate frequency spectrums for respective frequency bands of the frequency domain signal by mantissa parts and exponent parts;
each of the exponent parts is a scale factor of each of the frequency spectrums for the respective frequency bands;
the third step calculates the psychoacoustic model information based on dequantized frequency spectrums for the respective frequency bands generated by dequantizing the first audio stream information; and
the fourth step converts the first audio stream information into the second audio stream information having a bit rate lower than the first audio stream information by reallocating, based on the psychoacoustic model information, the number of bits allocated to the mantissa parts.

9. A coding method according to claim 8, wherein when performing downmix processing so as to reduce the number of channels of the second audio stream to less than the number of channels of the first audio stream, the third step calculates the psychoacoustic model information based on dequantized frequency spectrums for the respective frequency bands on which downmix processing has been performed.

10. A computer-readable recording medium having a program for causing a computer to execute coding processing thereon, the coding processing comprising:
a first step of decoding a first stream signal in which a first video stream including a first video stream information generated by coding a first video signal and a first audio stream including a first audio stream information generated by coding a first audio signal are multiplexed; and
a second step of generating, based on the decoded first stream signal, a second video stream including a second video stream information having a bit rate lower than the first video stream information and a second audio stream including a second audio stream information having a bit rate lower than the first audio stream information, and multiplexing the second video stream and the second audio stream to generate a second stream signal, wherein
the first audio stream information is obtained by performing a time-frequency conversion on the first audio signal into a frequency domain signal to quantize the frequency domain signal, and
the second step includes:
a third step of calculating psychoacoustic model information based on the quantized information indicating frequency bands of the first audio signal masked by auditory characteristics; and
a fourth step of converting, based on the psychoacoustic model information, the first audio stream information into the second audio stream information having a bit rate lower than the first audio stream information to generate the second audio stream.

11. A computer-readable medium according to claim 10, wherein:
the quantization of the frequency domain signal is performed to indicate frequency spectrums for respective frequency bands of the frequency domain signal by mantissa parts and exponent parts;
each of the exponent parts is a scale factor of each of the frequency spectrums for the respective frequency bands;
the third step calculates the psychoacoustic model information based on the scale factors of the frequency spectrums for the respective frequency bands included in quantized information; and
the fourth step converts the first audio stream information into the second audio stream information having a bit rate lower than the first audio stream information by reallocating, based on the psychoacoustic model information, the number of bits allocated to the mantissa parts.

12. A computer-readable medium according to claim 10, wherein:
- the quantization of the frequency domain signal is performed to indicate frequency spectrums for respective frequency bands of the frequency domain signal by mantissa parts and exponent parts;
- each of the exponent parts is a scale factor of each of the frequency spectrums for the respective frequency bands;
- the third step calculates the psychoacoustic model information based on dequantized frequency spectrums for the respective frequency bands generated by dequantizing the first audio stream information; and
- the fourth step converts the first audio stream information into the second audio stream information having a bit rate lower than the first audio stream information by reallocating, based on the psychoacoustic model information, the number of bits allocated to the mantissa parts.

13. A computer-readable medium according to claim 12, wherein when performing downmix processing so as to reduce the number of channels of the second audio stream to less than the number of channels of the first audio stream, the third step calculates the psychoacoustic model information based on dequantized frequency spectrums for the respective frequency bands on which downmix processing has been performed.

* * * * *

UNITED STATES PATENT AND TRADEMARK OFFICE
CERTIFICATE OF CORRECTION

PATENT NO. : 7,106,943 B2 Page 1 of 1
APPLICATION NO. : 09/955356
DATED : September 12, 2006
INVENTOR(S) : Takashi Katayama et al.

It is certified that error appears in the above-identified patent and that said Letters Patent is hereby corrected as shown below:

Title Page, Section (57), line 12 of the Abstract. "video stream is and" should read -- video stream and --.

Signed and Sealed this

Sixth Day of March, 2007

JON W. DUDAS
*Director of the United States Patent and Trademark Office*